Aug. 11, 1931.   H. THOMAS   1,818,175
MEANS FOR TREATING GLASS APPARATUS
Filed Aug. 24, 1928
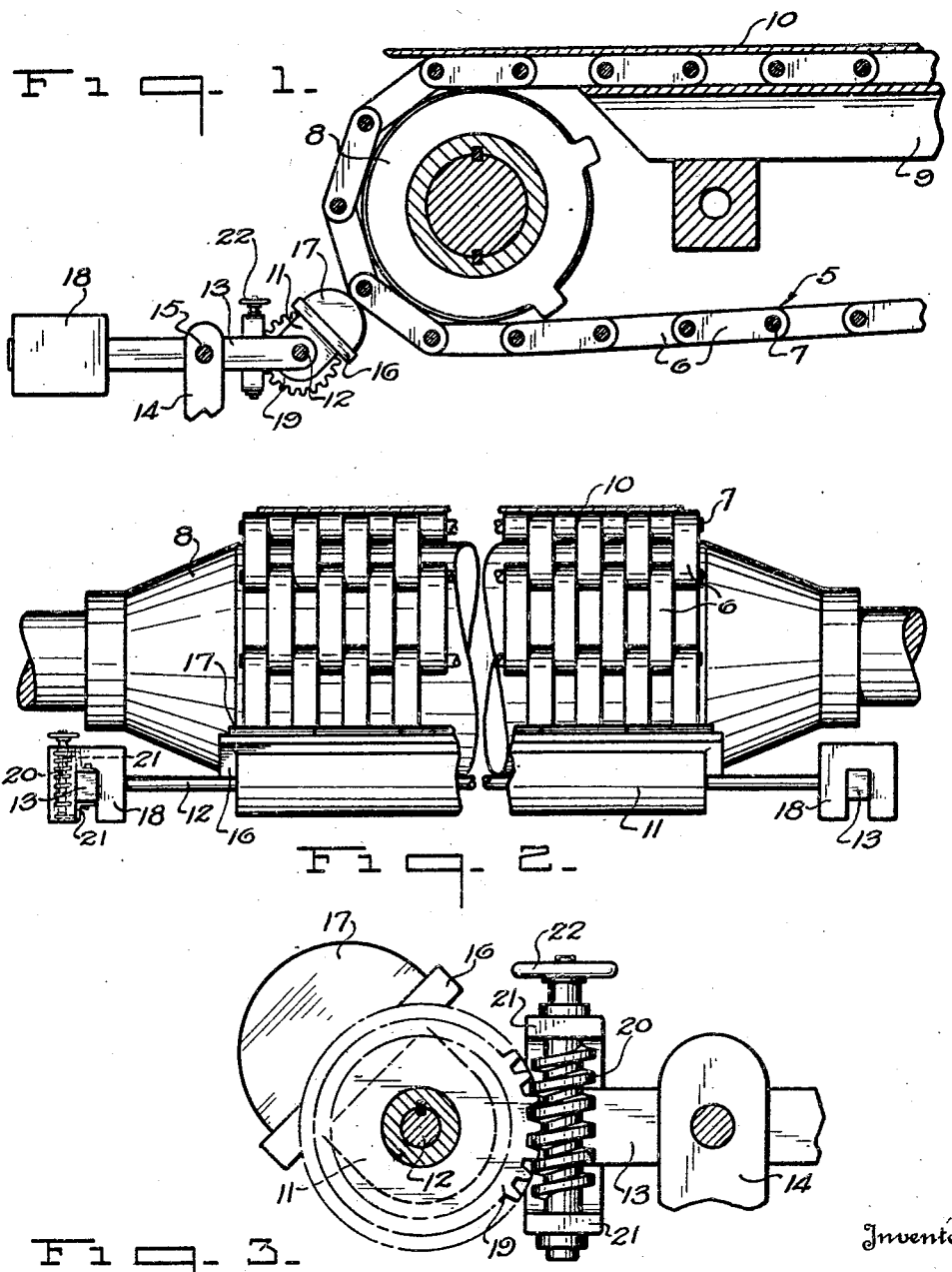
Inventor
Herbert Thomas.
By Frank Fraser
Attorney Patented Aug. 11, 1931

1,818,175

UNITED STATES PATENT OFFICE

HERBERT THOMAS, OF CHARLESTON, WEST VIRGINIA, ASSIGNOR TO LIBBEY-OWENS-FORD GLASS COMPANY, OF TOLEDO, OHIO, A CORPORATION OF OHIO

MEANS FOR TREATING GLASS APPARATUS

Application filed August 24, 1928. Serial No. 301,890.

This invention relates to the production of sheet glass and more particularly to an improved means for treating glass apparatus to prevent the surface of the sheet contacting therewith from becoming injured or marred.

In the Colburn system for forming sheet glass, wherein the sheet is first drawn vertically and subsequently deflected into the horizontal plane, there is utilized a drawing and flattening table upon which the sheet is supported and carried along in its passage to the annealing leer. This drawing and flattening table, commonly termed "draw table" for short, is ordinarily composed of a plurality of pivotally associated metallic links so arranged with respect to one another as to form an endless belt conveyor having an upper sheet carrying run and a lower return run. While the present invention has been designed primarily for use in connection with such an apparatus, it is of course not necessarily restricted thereto.

It is an aim and important object of this invention to provide a means for treating the draw table in such a manner as to create a protective medium between the sheet of glass and the surface of the draw table with which the sheet contacts.

Another object of the invention is the provision of novel means associated with the draw table for applying thereto a graphite compound, solution or other suitable material to form a coating thereupon which will serve to protect the sheet from scratches or other surface marks.

Other objects and advantages of the invention will become more apparent during the course of the following description when taken in connection with the accompanying drawings.

In the drawings forming a part of this application and wherein like numerals are employed to designate like parts throughout the same;

Fig. 1 is a vertical longitudinal section through a portion of a draw table showing the apparatus embodying the present invention associated therewith.

Fig. 2 is an end view thereof, and

Fig. 3 is an enlarged detail view of the means for adjusting the apparatus.

In the drawings, the numeral 5 designates in its entirety a portion of a draw table of the type ordinarily used in the Colburn system for drawing sheet glass. The draw table herein illustrated is composed of a plurality of preferably metallic links 6 pivotally associated with one another in an intermeshing and overlapping relation by means of continuous cross rods 7 to form an endless belt conveyor which is trained at the opposite ends of its loop about drums or sprockets 8. The upper run of the table is supported upon stationary draw table rails or the like 9 and is adapted to support upon its upper surface the newly drawn sheet of glass 10. It is of course to be understood that the invention is not limited to the particular type of draw table disclosed. Also, that the table need not necessarily be horizontally arranged but may be positioned to engage the sheet while traveling vertically.

The apparatus herein provided for treating or applying a protective coating or medium to the draw table links comprises an elongated holder 11 arranged transversely of the table at one end thereof. This holder is carried upon a shaft 12 journaled at its opposite ends in arms 13, which arms extend rearwardly and are pivoted intermediate their ends to vertical supports or standards 14 as indicated at 15. The holder 11 includes a supporting plate 16 carrying a plurality of graphite blocks 17. These blocks, which are arranged in abutting relation, extend the entire width of the draw table and are urged toward and yieldably held in engagement therewith by means of the counterweights 18 carried at the outer ends of arms 13. While the use of graphite has been herein specifically stated, it will be readily apparent that any other material found suitable for this purpose may be employed or, if preferred, the blocks 17 may be of wood or metal and provided with a covering or coating of the desired material. Also, a single graphite slab may be used instead of a plurality of blocks.

In operation, the counterweights 18 function to rock the arms 13 about their pivots 15 to hold the graphite blocks or the like 17 in engagement with the draw table and as the said draw table is rotated, the links thereof coming in contact with and rubbing against the graphite blocks will be covered with a protective film or coating which serves as a medium to protect the sheet from being injured or marred by the links with the result that the sheet should be of an improved quality relatively free from scratches and other surface marks ordinarily occasioned by the contact thereof with the draw table. Thus, there will be provided a protective medium between the sheet and surface of the draw table with which the sheet contacts and this is very desirable especially when the sheet is in a relatively hot state and noticeably subject to surface impressions.

After a certain length of time, the surface of the graphite blocks in contact with the draw table will wear away or the material will be rubbed off at this point of contact and it will therefore be readily perceived that it is desirable that the graphite blocks be adjustable so that as one part of the surface becomes worn, a new part can be presented to the draw table. To accomplish this, there is carried by the shaft 12 a worm gear 19 meshing with a vertical worm screw 20 journaled in brackets 21 carried by one of the arms 13. The worm screw 20 is operable by means of a hand wheel 22 and upon rotation thereof, the holder 11 carrying the graphite blocks can be rotated or turned about the axis of rotation of shaft 12. In this manner, the point of contact of the blocks with the draw table can be changed as desired to present new rubbing surfaces to the table with the result that the period of active service of the blocks may be greatly increased.

While the means embodying the present invention has been illustrated as associated with a draw table, it may also be used, subject to certain modifications, to treat other parts of the glass apparatus with which the hot sheet contacts such as for example the bending roll and leer rolls.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim

1. The combination with a circulatory glass supporting table, of means for applying a protective medium thereto including a holder, means carried by the holder and engaging the table to apply the protective medium thereto, and means for adjusting said holder to bring new medium applying surfaces into contact with said table.

2. The combination with a circulatory glass supporting table, of means for applying a protective medium thereto including a stationary holder, one or more graphite blocks carried by the holder, and means for adjusting said holder to bring new surfaces of the graphite block or blocks into engagement with said table.

3. The combination with a circulatory glass supporting table, of means for applying a protective medium thereto including a holder arranged transversely of the table, a shaft carrying said holder, arms within which the opposite ends of said shaft are journaled, said arms being pivoted intermediate their ends, protective medium applying means carried by said holder, counterweights carried at the outer ends of said arms to hold said last named means in engagement with said table, a worm gear keyed to the shaft, and a worm screw mounted upon one of said arms and meshing with said gear and adapted upon rotation thereof to effect adjustment of the holder about the axis of said shaft to bring new protective medium applying surfaces into contact with said table.

4. In sheet glass apparatus, means for drawing a sheet from a mass of molten glass, stationary means mounted adjacent said drawing means for applying a protective medium thereto including a holder, adjustable means for supporting said holders, and means for adjusting the holder to bring new protective applying surfaces into contact with said drawing means.

5. The combination with a circulatory glass supporting table, of means for applying a protective coating thereto, including a member, graphite blocks carried thereby, means for supporting said member, and means carried by said supporting means for effecting adjustment of said member to bring a new surface of the graphite block into contact with said table.

6. The combination with a circulatory glass supporting member, of means for applying a protective coating thereto, including graphite blocks, means for normally maintaining said blocks in contact with said member, and means for adjusting the graphite block holding means to bring a new surface into contact with said member.

7. The combination with a movable glass supporting surface, of means for applying a protective medium thereto including supporting means, means carried by said supporting means and engaging the movable surface to apply a protective medium thereto, and means for adjusting said second mentioned means to bring different medium applying surfaces into contact with said movable surface.

Signed at Charleston, in the county of Kanawha and State of West Virginia, this 20th day of August, 1928.

HERBERT THOMAS.